(12) United States Patent
Yang

(10) Patent No.: US 6,490,319 B1
(45) Date of Patent: Dec. 3, 2002

(54) REGION OF INTEREST VIDEO CODING

(75) Inventor: Liuyang Yang, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/337,788

(22) Filed: Jun. 22, 1999

(51) Int. Cl.[7] .............................. H04N 7/36; H04N 7/50
(52) U.S. Cl. ............................ 375/240.03; 375/240.08
(58) Field of Search .................. 375/240.03, 240.08, 375/240.01; H04N 7/36, 7/50

(56) References Cited

U.S. PATENT DOCUMENTS

| | | | | |
|---|---|---|---|---|
| 5,790,695 A | * | 8/1998 | Suwa | 375/240.03 |
| 5,929,912 A | * | 7/1999 | Aono et al. | 375/240.03 |
| 5,990,957 A | * | 11/1999 | Ryoo | 375/240.03 |
| 6,088,392 A | * | 7/2000 | Rosenberg | 375/240.03 |
| 6,339,657 B1 | * | 1/2002 | Yamaguchi et al. | 375/240.03 |

* cited by examiner

*Primary Examiner*—Howard Britton
(74) *Attorney, Agent, or Firm*—Schwegman, Lundberg, Woessner & Kluth, P.A.

(57) ABSTRACT

A video system and method allow for control of a video quality contrast between a region of interest of a video image and background of the video image. Quality contrast can be controlled in real-time as the video images are being transmitted. A video controller allows the quantization levels of the two regions of video image to be controlled by a user. A user interface provides a slider control to allow the user to easily adjust the contrast between the quantization levels.

20 Claims, 4 Drawing Sheets

REGION OF INTEREST VIDEO CODING

TECHNICAL FIELD OF THE INVENTION

The present invention relates generally to video displays and in particular the present invention relates to bit rate control over a region of interest of a video display.

BACKGROUND OF THE INVENTION

The use of video images has become commonplace in recent years. For example, video images are commonly used in security surveillance. In addition, video teleconferencing has enjoyed widespread acceptance in both business and private settings. Video images, as with any type of imagery, provide a picture of multiple objects in a video frame. Sometimes, one object, or a region of the video frame which contains certain objects, is considered more interesting to a viewer than the rest of the video frame. As such, more data bits may be devoted to the coding of this region of the video frame to provide a better overall visual experience. Usually, a region of interest is a dominant foreground object, such as the face of a person provided in the video image.

Because a video image typically contains a fixed amount of data bits, the visual quality of the foreground object is achieved at the expense of the background quality. That is, with a fixed data bandwidth, increasing the quality of one region of a video image decreases the quality of other regions of the video image. Balancing the quality differential between regions of the video image is difficult when the content and data rate of a video image change. There are occasions when a background image is of no interest to a viewer, and the highest quality of a foreground image is desired at the expense of a blurry background image. In contrast, there are occasions when a background image is as important as the foreground image, and it is desirable not to decrease the quality of the background image.

Video data is often compressed using a compression/decompression algorithm (codec) by a bit rate controller. The codec compresses all of the video image data contained in each video frame into a predetermined number of bits. That is, the video image is quantized using the predetermined number of bits. Conventional flat frame encoding uses only one quantization level. In video applications where a region of interest has been identified in a video image, the codec allocates a greater number of the available bits to data provided in the region of interest. The controller uses two quantization levels, one for the region of interest and another for the background region. The quantization level differential between a region of interest and the background of a video frame is typically static and remains constant during a video stream communication. Thus, a viewer cannot adjust the quality of regions of a video image in real-time.

For the reasons stated above, and for other reasons stated below which will become apparent to those skilled in the art upon reading and understanding the present specification, there is a need in the art for a method of real-time adjusting the quality of regions of a video image.

SUMMARY OF THE INVENTION

In one embodiment, a video system comprises a video camera for capturing a video image represented by a first plurality of data bits, and a video compression device coupled to receive the video image from the video camera. The video compression device compresses the first plurality of data bits into a second plurality of data bits. A video compression controller is coupled to the video compression device for selecting a first and second quantization level for use in compressing the first plurality of data bits. The first quantization level is used to compress a first region of the video image and the second quantization level is used to compress a second region of the video image.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Transmitting video images often requires compressing the video image into a predetermined number of bits per frame. The number of bits per frame that are available is usually determined by a bit rate of the communication network, or link. For example, in a network which operates at 28.8 Kbps, where 20 Kb is allocated to data and 8.8 Kb is allocated to overhead, the number of bits available per video frame is determined by the number of frames per second captured by a video camera. If 10 video frames are captured per second, there is 2 Kb of data available to communicate the content of each video frame. A video image, as known to those skilled in the art, is represented by a large number of pixels. Often, each pixel is represented by an intensity level having a value in the range of 0 to 255. Quantization is the process of compressing the 256 intensity levels into a reduced number of levels. For example, the 0 to 255 possible intensity levels can be compressed into 32, 16, 8, 4 or even 2 levels. As such, the original data required 8 bits of information per pixel while the compressed data requires 5, 4, 3, 2, or 1 bits per pixel, respectively. It will also be appreciated that reducing the number of intensity levels used per pixel will decrease the video quality of each pixel. It will be appreciated that different quantization levels can be used, and the present invention is not limited to those listed. The term 'quality' as used herein refers to the granularity of intensity levels used for each pixel. The more intensity levels used per pixel, the higher the pixel quality.

Figure 1A:
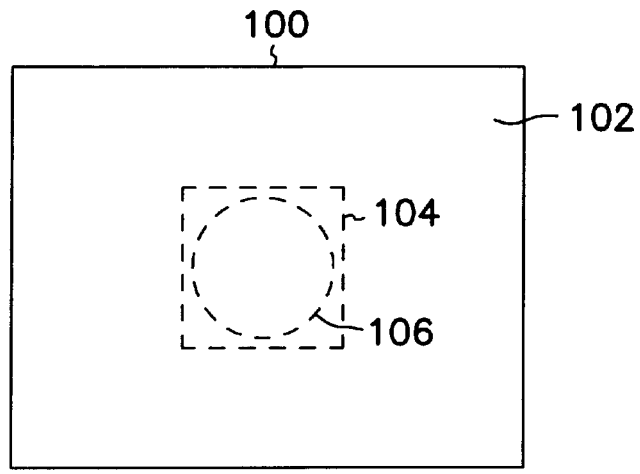
FIG. 1a illustrates a video frame having a background and region of interest.

As explained above, two quantization levels can be provided to increase the video quality of a region of interest. Referring to FIG. 1a, a video frame 100 is illustrated. The video frame, or image, includes a background 102 and a region of interest 104 or 106. Two different types of region-of-interest geometric shapes are illustrated, a rectangle 104 and a circle 106. The present invention is not limited to any specific region of interest shape, and the two described geometric shapes are merely used as illustration.

By allocating a quantization level to the region of interest 104 or 106 which stores more intensity levels per pixel, the video quality of the background 102 is sacrificed. One embodiment of the present invention allows for the allocation of available data bits per video frame to maximize the video quality of a particular region of interest on a real-time basis. It will be appreciated with the benefit of this description that the present can be used to provide multiple regions of interest and is not limited to a single foreground region.

For region of interest coding, a controller uses two quantization levels, one for the region of interest ($Q_{fore}$) and another for the background ($Q_{back}$) region. Typically, the total quantization level in a codec is an integer number in a finite range, 1 to M. Therefore, $Q_{fore}$, $Q_{back} \in [0, M]$. The relationship between $Q_{fore}$ and $Q_{back}$ typically remains constant for a video stream such that a user establishes a constant ratio between the two quantization levels is used for the video.

For a given data rate R, there are more than one possible pairs of ($Q_{fore}$, $Q_{back}$) that will satisfy the total bit rate constraint for the whole video frame. In general, there exists a set of such pairs that meet the target bit rate R which can be described mathematically as $S = \{(Q_{fore}, Q_{back}): Q_{fore} \in [Q_{min}, Q_{max}], Q_{back} \in [Q_{max}, M]\}$, where $Q_{max}$ and $Q_{min}$ are explained as follows.

Assuming that a differential quality contrast between the background and the foreground of a video image is zero, both regions of the video image are quantized to the same level. This quantization level is referred to herein as $Q_{max}$. This maximum quantization level for both the foreground and background provides an actual bit rate for the video frame which is close to the target bit rate, R. Using this quantization level for both the foreground and background provides one extreme where there is no quality contrast differential between the two regions of the video image.

The opposite extreme is where the quantization level of the background region is maximized and the remaining data rate is used to quantize the foreground data. As such, the foreground is quantized to the highest quality level possible. With $Q_{fore} = Q_{min}$ and $Q_{back} = M$ the maximum quality contrast differential between the two regions of the video image is obtained.

Figure 1B:
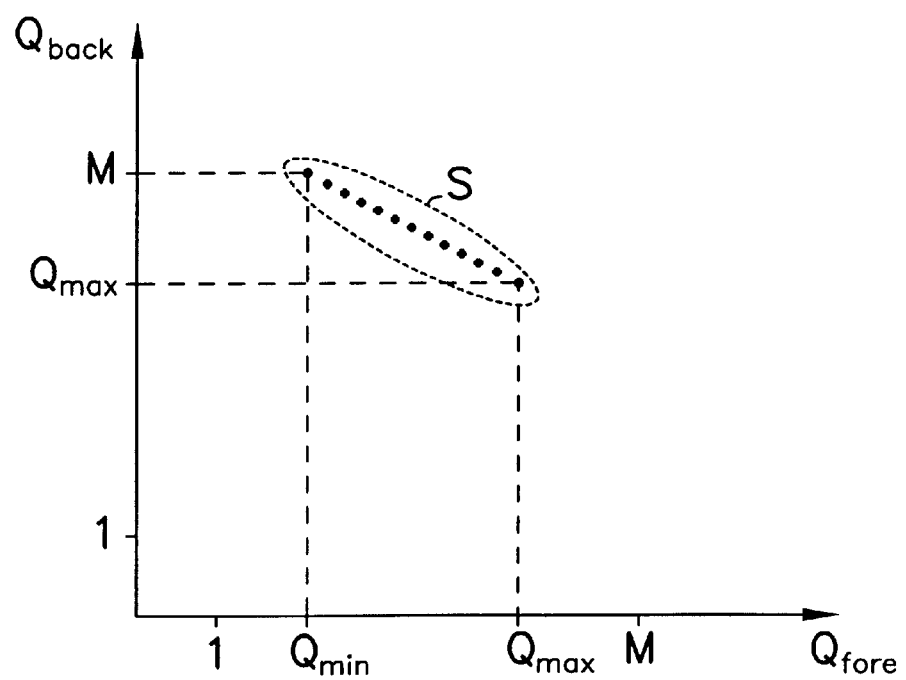
FIG. 1b illustrates a graph of foreground and background quantization levels.

Referring to FIG. 1b, a set S of pairs ($Q_{fore}$, $Q_{back}$) which meet a target bit rate is illustrated. The set of pairs exists between the two end points illustrated, and all points in the set meet the target bit rate constraint. The different points, however, represent different quality contrast values between the foreground and background of a video image. The quality contrast value is controlled by a parameter value, $\lambda$. The parameter value $\lambda$ is defined as a floating point number between zero and one. When $\lambda = 0$, $\lambda$ represents the point in the set where $Q_{fore} = Q_{back} = Q_{max}$, while $\lambda = 1$ represents the point in the set where $Q_{fore} = Q_{min}$ and $Q_{back} = M$. The parameter value $\lambda$ can be viewed as a slider control to define the contrast between a region of interest and background images in a video, and S is a set of points obtained by sliding $\lambda$ between 0 and 1. With a user specified $\lambda$ value in [0, 1], the foreground quantization is interpolated as an integer around $Q_{fore} = Q_{max} - \lambda(Q_{max} - Q_{min})$, and the corresponding $Q_{back}$ can be calculated. Because the system is not limited to two regions, the present invention can be implemented as a multiple-dimension graph, or set.

Figure 2:
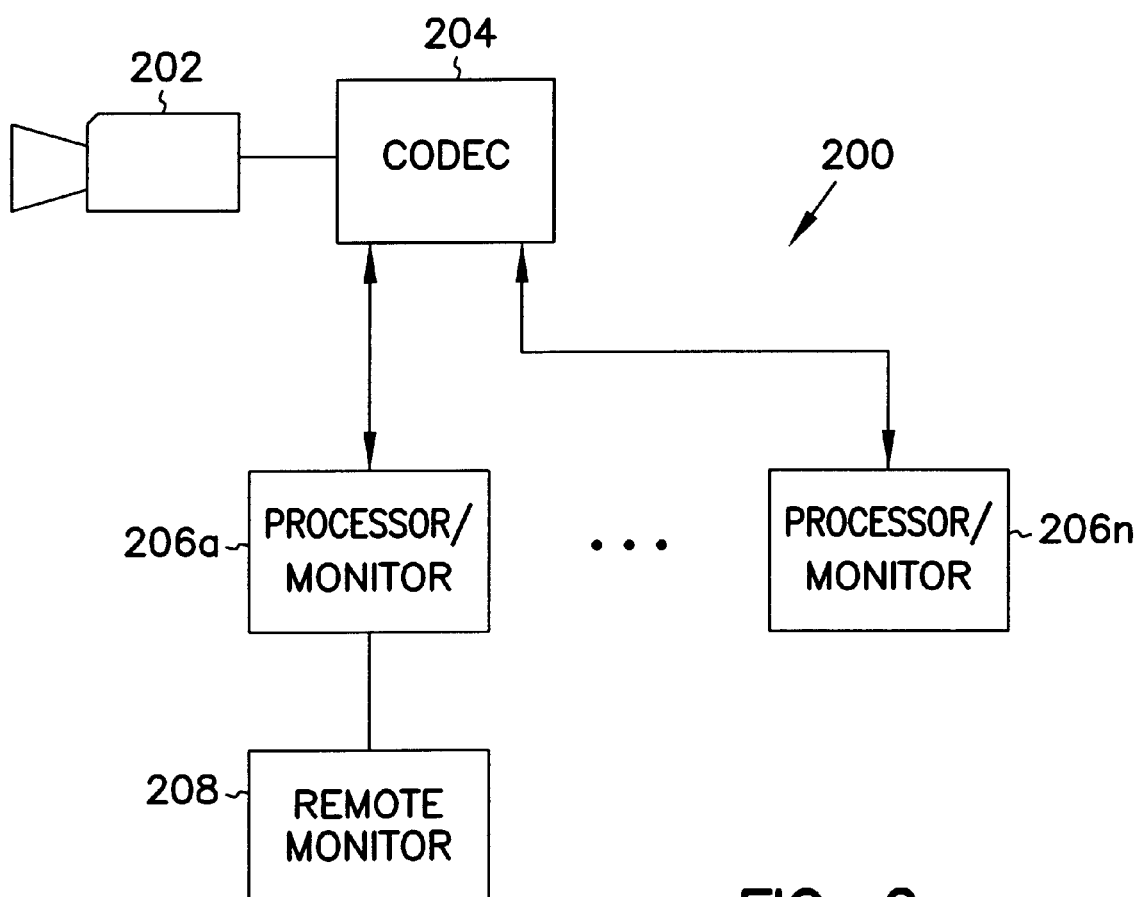
FIG. 2 is a video system according to one embodiment of the present invention.

One example of a video system of the present invention is illustrated in FIG. 2. The video system 200 includes a video camera 202, a compression/decompression (codec) device 204, and at least one video processor/monitor 206a–206n to display video images captured by the video camera. The codec has an input for receiving video data comprising a first plurality of bits, and an output for providing a second plurality of bits representing the received video data. The second plurality of bits is less than the first plurality of bits such that the received video data is compressed by the codec. The codec also includes a processor to compress the first plurality of bits according to a compression algorithm. The compression algorithm compresses a first portion of the video data (region of interest) using a first quantization level, and compresses a second portion of the video data (background) using a second quantization level.

Each video processor 206 receives output signals provided by codec 204. Each video processor has the ability to adjust a quality contrast level in real-time by sending a control signal to the codec. This video system can be used for security surveillance or other video application. As such, if an operator of the surveillance system wants to increase the clarity of a region of interest, for example the image of a person, the quality contrast between the region of interest and the background can be adjusted in real-time. A back channel, therefore, can be provided to the video processor to signal the desired quality contrast. It will be appreciated that only one video processor can control the contrast of the video image at one time, unless multiple codec's are provided. A remote monitor 208 can also be used to provide a passive video monitor which receives the video image controlled by video processor 206a. This remote monitor cannot adjust the image contrast of the video image.

Figure 3:
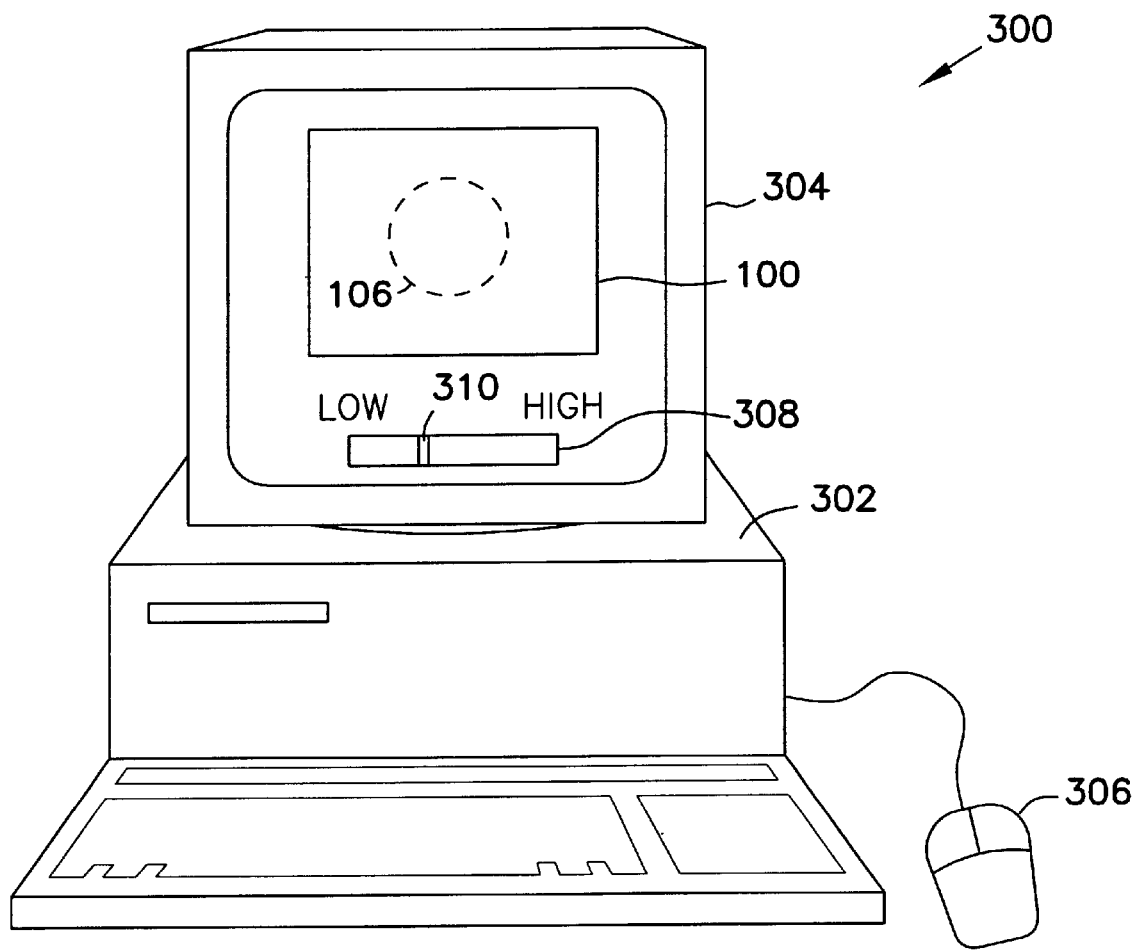
FIG. 3 is a computer video controller according to one embodiment of the present invention.

In one embodiment illustrated in FIG. 3, $\lambda$ can be controlled using a visual slider input provided on a computer monitor screen. A computer system 300 is illustrated which is executing a set of instructions which allow it to operate as a video processor 206. These instructions can be provided on a computer readable medium, such as a magnetic diskette, or optical medium such as a compact disc. The computer system includes a processor 302, a monitor 304, and an input device such as a keyboard, or mouse 306. In operation, the monitor displays a video image 100 which can include a region of interest 106, as explained above. The processor also displays a visual slider 308 which allows a user to move a cursor 310 to define the contrast between the region of interest and the background. The slider has a range between a low and high quality contrast. This graphical user interface allows a viewer of the video to adjust the quality of the video in a fast, real-time manner.

The slider control allows a viewer to adjust the contrast between a region of interest and background images in real-time. That is, as a video image is being captured, the user has the ability to adjust the quantization levels used for different regions of the video image. It will be appreciated by those skilled in the art after reading the present detailed description that the slider control can be provided for use by different users. That is, different viewers can control the quantization level used to transmit a video image.

Figure 4:
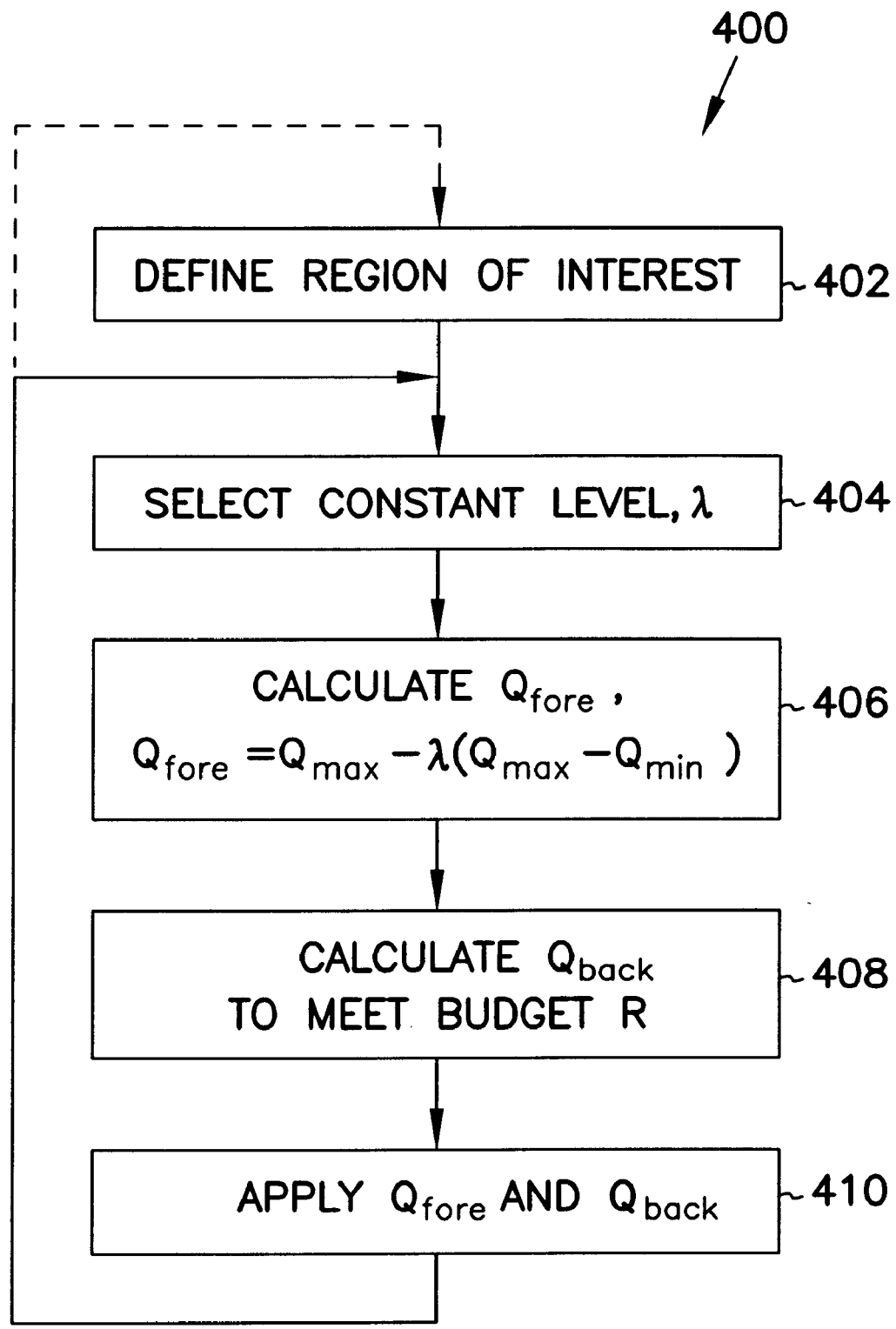
FIG. 4 is a flowchart illustrating a method according one embodiment of the present invention.

Referring to FIG. 4, one embodiment of a method 400 of controlling a video image in real-time is illustrated. For purposes of understanding the present invention the method has been simplified and does not necessarily describe all steps in capturing and displaying a video image. The first step 402 illustrated defines the region of interest. The region of interest can be defined as a constant region of a video image, such as a centered rectangle. Alternatively, the video controller can allow a user to define a region of interest in real-time. That is, using an input device the user can specify a geometric region of the video image to enhance. Further, the codec can execute an algorithm to select a region of interest based on the content of the video. After the region of interest has been defined, the quality contrast level, A, between the region of interest and the background is selected at step 404. Using this contrast level, the foreground quantization level is calculated at step 406, as explained above. After the foreground quantization level is calculated, the background quantization is calculated at step 408 to meet the bit rate budget, R. That is, the area of the region of interest (pixels) and the quantization level of that region require a set amount of data space (bits). Using the available data budget (total bits available per screen), the number of bits available for the image contained in the background is easy to calculate. Using the available background data bits and the size (# of pixels) of the background, the quantization for the background, $Q_{back}$, is computed.

Finally, the two quantization levels are applied to the video image at step 410. Because this method is controlled in real-time, the user can select a new contrast level by returning to step 404. Alternatively, an option can be provided to allow the user to return to step 402 to define a new region of interest to enhance a new region of interest.

Conclusion

A video system and method have been described which allows a user to control a contrast between a region of interest of a video frame and a background of the video frame. The user has the ability to control this contrast in real-time as the video images are being transmitted. One embodiment described provides a video controller which controls the quantization levels of the two regions of a video image. A user interface has been described which provides a slider control to allow the user to easily adjust the contrast between the quantization levels. A method has been described which can be implemented using a computer that is executing a set of instructions to allow the computer to control the quality of a video image.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A video system comprising:
   a video compression device coupled to receive the video image represented by a first plurality of data bits from a video camera, the video compression device compresses the first plurality of data bits into a second plurality of data bits; and
   a video compression controller coupled to the video compression device for selecting a first and second quantization level for use in compressing the first plurality of data bits, the first quantization level is used to compress a first region of the video image and the second quantization level is used to compress a second region of the video image, the first and second quantization levels selected in response to a requested quality contrast level.

2. The video system of claim 1 wherein the first region of the video image comprises a region of interest defined by the video compression device.

3. The video system of claim 1 wherein the first region of the video image comprises a region of interest defined by the video compression controller.

4. The video system of claim 1 wherein the video compression controller is a computer having a user input device for selecting a contrast level between the first and second regions of the video image.

5. The video system of claim 4 wherein the computer further comprises a monitor for displaying the video image and a graphical user interface for selecting the contrast level.

6. The video system of claim 1 wherein the first quantization level, $Q_{fore}$, is defined as:
   $Q_{fore}=Q_{max}-\lambda(Q_{max}-Q_{min})$, where $Q_{max}$ is a maximum available quantization level where the first and second regions of the video image have no quality contrast differential, $\lambda$ is a contrast value representing the quality contrast level between the first and second regions of the video image, and $Q_{min}$ is a quantization level for the first region such that the first and second regions of the video image have a maximum available quality contrast differential.

7. A video compression device comprising:
   an input for receiving video data comprising a first plurality of bits;
   an output for providing a second plurality of bits representing the received video data, the second plurality of bits has fewer bits than the first plurality of bits such that the received video data is compressed; and
   a processor to compress the first plurality of bits according to a compression algorithm, the compression algorithm compresses a first portion of the video data using a first quantization level, and compresses a second portion of the video data using a second quantization level, where the first and second quantization levels are selected in response to a requested quality contrast level.

8. The video compression device of claim 7 wherein the first quantization level, $Q_{fore}$, is defined as:
   $Q_{fore}=Q_{max}-\lambda(Q_{max}-Q_{min})$, where $Q_{max}$ is a maximum available quantization level where the first and second portions of the video data have no quality contrast differential, $\lambda$ is a contrast value representing a quality contrast level between the first and second portions of the video data, and $Q_{min}$ is a quantization level where the first and second portions of the video data have a maximum available quality contrast differential.

9. The video compression device of claim 7 wherein the first portion of the video data is a region of interest defined by the processor.

10. A method of processing a video image, the method comprising:
    establishing both a region of interest and a background region of the video image;
    defining a quality contrast level between the region of interest and the background region;
    determining a first quantization level used to compress data representing the region of interest in response to the defined quality contrast level; and
    determining a second quantization level used to compress data representing the background region.

11. The method of claim 10 wherein the region of interest and the background region are defined by a viewer of the video image.

12. The method of claim 10 wherein the quality contrast level is defined by a viewer of the video image.

13. The method of claim 10 wherein the first quantization level is determined using the quality contrast level and the maximum number of data bits available for representing a frame of the video image.

14. The method of claim 10 further comprising:
  receiving a first plurality of data bits representing the video image; and
  compressing the first plurality of data bits into a second plurality of data bits using the first and second quantization levels.

15. The method of claim 10 wherein the first quantization level, $Q_{fore}$, is defined as:
  $Q_{fore}=Q_{max}-\lambda(Q_{max}-Q_{min})$, where $Q_{max}$ is a maximum available quantization level where the region of interest and the background region have no quality contrast differential, $\lambda$ is a contrast value representing a quality contrast level between the region of interest and the background region, and $Q_{min}$ is a quantization level of the region of interest such that the region of interest and the background region have a maximum available quality contrast differential.

16. The method of claim 10 wherein the quality contrast level differential is defined by a viewer of the video image using a graphical input device.

17. A computer readable medium containing computer instructions for instructing a processor to perform the method of:
  displaying a video image on a monitor which is coupled to the processor;
  establishing a quality contrast level between two regions of the video image in response to a user controlled input device; and
  providing control signals to an external video signal compression device to adjust the quality contrast level between the two regions of the video image.

18. The computer readable medium of claim 17 further comprising instructions to instruct the processor to display a graphical user interface for establishing the quality contrast level.

19. The computer readable medium of claim 17 further comprising instructions to instruct the processor to calculate first and second compression quantization levels for respectively compressing data representing the two regions of the video image.

20. The computer readable medium of claim 17 wherein the processor adjusts the quality contrast level between the two regions of the video image in response to the user controlled input device.

* * * * *

UNITED STATES PATENT AND TRADEMARK OFFICE
CERTIFICATE OF CORRECTION

PATENT NO. : 6,490,319 B1
DATED : December 3, 2002
INVENTOR(S) : Liuyang Yang

It is certified that error appears in the above-identified patent and that said Letters Patent is hereby corrected as shown below:

Column 5,
Line 9, delete "A," and insert -- $\lambda$, -- therefor.
Line 40, delete "quantization levels" and insert -- regions -- therefor.

Signed and Sealed this

Twenty-sixth Day of July, 2005

JON W. DUDAS
*Director of the United States Patent and Trademark Office*